(12) United States Patent
Borger et al.

(10) Patent No.: US 10,801,754 B2
(45) Date of Patent: Oct. 13, 2020

(54) PRODUCT FOR HEATING

(71) Applicant: UNIQAN OY, Vantaa (FI)

(72) Inventors: Nina Borger, Vantaa (FI); Alle Borger, Vantaa (FI)

(73) Assignee: UNIQAN OY, Vantaa (FI)

( * ) Notice: Subject to any disclaimer, the term of this patent is extended or adjusted under 35 U.S.C. 154(b) by 77 days.

(21) Appl. No.: 16/067,389

(22) PCT Filed: Dec. 29, 2016

(86) PCT No.: PCT/FI2016/000031
§ 371 (c)(1),
(2) Date: Jun. 29, 2018

(87) PCT Pub. No.: WO2017/118775
PCT Pub. Date: Jul. 13, 2017

(65) Prior Publication Data
US 2019/0024945 A1    Jan. 24, 2019

(30) Foreign Application Priority Data
Jan. 4, 2016 (FI) ..................... 20160002

(51) Int. Cl.
*B32B 3/00* (2006.01)
*F24S 20/30* (2018.01)
(Continued)

(52) U.S. Cl.
CPC ............... *F24S 20/30* (2018.05); *F24S 20/50* (2018.05); *F24S 20/55* (2018.05); *F24S 70/12* (2018.05);
(Continued)

(58) Field of Classification Search
CPC .. F24S 20/30; F24S 20/50; F24S 20/55; F24S 70/12; F24S 70/20; F24S 70/65; F24S 70/225
See application file for complete search history.

(56) References Cited

U.S. PATENT DOCUMENTS 3,920,413 A    11/1975  Lowery
4,015,582 A     4/1977  Liu et al.
(Continued)

FOREIGN PATENT DOCUMENTS

CN    1491337 A    4/2004
CN    2708179 Y    7/2005
(Continued)

OTHER PUBLICATIONS

Search Report Finnish Patent and Registration Office for 20160002, dated Apr. 19, 2016.
(Continued)

*Primary Examiner* — Elizabeth E Mulvaney
(74) *Attorney, Agent, or Firm* — McDonnell Boehnen Hulbert & Berghoff LLP

(57) ABSTRACT

The invention relates to a product for heating comprising at least one heating unit (2), which comprises a base material layer with an emission reducing structure on top of said an energy converting structure, combined together to form a selective absorber layer on at least one of the sides of the base material layer, at least one insulation layer (4, 5, 6, 7) of transparent flexible material located on the heating unit (2), which heating unit and the at least one insulation layer on the heating unit (2) of the product (1) are attached to each other air-tightly on the sides such that between at least some of the layers at least one closed air pocket (10, 11) is formed, characterized in that the content to be heated by the product is located below to the base material of the heating unit of the product (1), that temperature of the content of the
(Continued)

Figure 1:
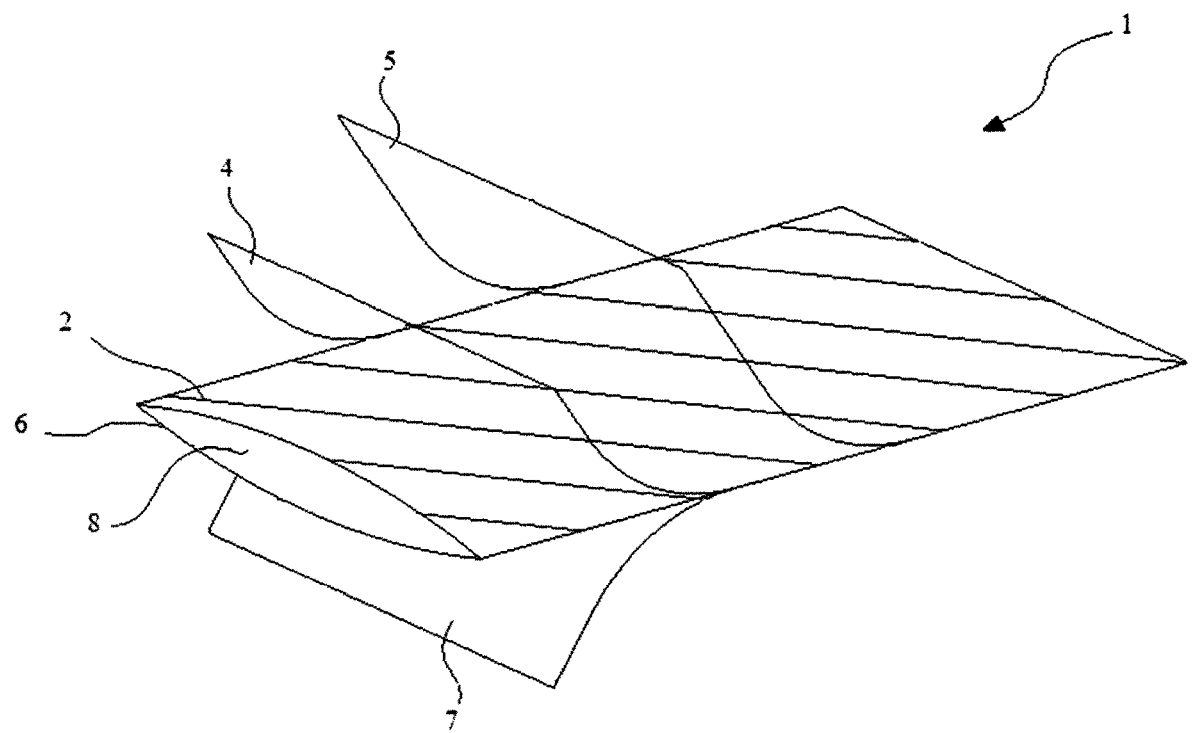

product (1) will be 90° C.-160° C., as result of the placing the product (1) exposed to radiation of selected wavelengths, and that the energy converting structure in the selective absorber layer has an absorption factor (aS) of a minimum of 0.9 and the emission reducing structure has an emission factor (E) of a maximum of 0.1 and that ratio between the absorption factor (aS) and the emission factor (E) is equal or higher than 9 and that when the selective absorber is exposed to wavelengths ranging from 350 nm to 4000 nm, the energy converting structure converts the wavelengths to thermal energy ranging from 4000 nm to 40.000 nm and the emission of thermal energy is reduced by the emission reducing structure and the contained energy is being used for heating the content of the product (1).

14 Claims, 4 Drawing Sheets

(51) Int. Cl.
*F24S 70/12* (2018.01)
*F24S 80/50* (2018.01)
*F24S 70/20* (2018.01)
*F24S 20/50* (2018.01)
*F24S 70/225* (2018.01)
*F24S 20/55* (2018.01)
*F24S 70/65* (2018.01)
*F24S 80/56* (2018.01)
*F24S 80/00* (2018.01)

(52) U.S. Cl.
CPC ............ *F24S 70/20* (2018.05); *F24S 70/225* (2018.05); *F24S 70/65* (2018.05); *F24S 80/50* (2018.05); *F24S 80/56* (2018.05); *F24S 2080/011* (2018.05); *Y02E 10/40* (2013.01)

(56) References Cited

U.S. PATENT DOCUMENTS

| | | | |
|---|---|---|---|
| 4,312,915 A * | 1/1982 | Fan | F24S 70/25 |
| | | | 428/323 |
| 5,181,896 A | 1/1993 | Jones | |
| 5,531,217 A | 7/1996 | Louw | |
| 7,883,138 B2 | 2/2011 | Russke | |
| 2009/0133688 A1 | 5/2009 | La | |
| 2010/0071686 A1 | 3/2010 | Nix | |
| 2011/0011808 A1* | 1/2011 | Husson, Jr. | C02F 1/14 |
| | | | 210/748.11 |
| 2014/0158839 A1 | 6/2014 | Doyle | |

FOREIGN PATENT DOCUMENTS

| | | |
|---|---|---|
| CN | 101 876 490 B | 10/2012 |
| CN | 102 095 265 B | 6/2013 |
| CN | 104 949 362 A | 9/2015 |
| DE | 25 15 398 A1 | 10/1976 |
| DE | 2721964 A1 | 11/1978 |
| ES | 1077068 | 5/2012 |
| FR | 2 355 256 A1 | 1/1978 |
| JP | 2004239478 A | 8/2004 |
| JP | 2009 268839 A | 11/2009 |
| JP | 2014 172129 A | 9/2014 |
| MX | 2007003296 A | 10/2008 |
| WO | WO 79/00225 A1 | 5/1979 |
| WO | WO 02/066905 A2 | 8/2002 |
| WO | WO 2011/004410 A1 | 1/2011 |
| WO | WO 2014/044712 A1 | 3/2014 |
| WO | 2014122667 A1 | 8/2014 |
| WO | WO 2015/048688 A1 | 4/2015 |
| WO | WO 2015/147584 A1 | 10/2015 |

OTHER PUBLICATIONS

Supplementary European Search Report for European Application No. EP 16 88 3492; completed Jul. 12, 2019, 3 pages.
Supplementary European Search Report for European Application No. EP 117 77 8733; completed Oct. 18, 2019, 2 pages.
Supplementary European Search Report for European Application No. EP 117 77 8734; completed Oct. 18, 2019, 2 pages.
English Translation of Search Report for Chinese Application No. 201680076657.3; dated Jul. 29, 2019, 2 pages.
The International Search Report (ISR) for PCT/FI2016/000031 dated Feb. 2, 2017, pp. 1-4.
Written Opinion of the International Searching Authority for PCT/F12016/000031 dated Feb. 2, 2017, pp. 1-4.

* cited by examiner

PRODUCT FOR HEATING

CROSS-REFERENCE TO RELATED APPLICATION

This application is a U.S. national phase of International Application No. PCT/FI2016/000031, filed on Dec. 29, 2016, which claims priority to Finland Patent Application No. 20160002, filed Jan. 4, 2016, both of which are incorporated by reference herein in their entirety.

The invention relates to cookers and particularly the invention relates to a product for heating its content with energy derived from different wavelengths and more particularly the invention relates to a product for heating according to the preamble of claim 1.

Solar energy (solar radiation) can be converted into thermal energy. Solar radiation (energy) impinging on solid bodies increases the oscillation of atoms in the absorption of the solar radiation and heat energy is generated. Irradiance depends on the position of the sun, for example depending on the time of day, the latitude and the season, and the direction of the radiation, for example depending on azimuth and deviance to the south. The atoms in black color are only loosely bound to each other. Thus in black color very intense oscillation of the atoms and further more intense conversion of solar radiation into heat energy is achieved. The conversion of solar radiation into heat energy takes place inside an absorber of a solar panel. The absorption of this "short wave" radiation results in an emission of "long wave" heat radiation, i.e., infra-red radiation. When absorbance=1, or 100%, the radiation is entirely absorbed. Typically actual absorption of solar radiation with a black absorber is 92%-98% and actual emission of heat radiation with black bodies is 75%-85%. Whereas selective surface coating of absorbers reduces emissions to only 3%-5%, especially when titanium oxide nitride-coating is used either on copper or aluminum, or ceramic coatings are used. The selectivity of a solar selective layer/surface or a selective absorber is defined as the ratio of solar radiation-absorption (alpha) to thermal infrared radiation-emission (epsilon). Selective surfaces take advantage of the differing wavelengths of incident solar radiation and the emissive radiation from the absorbing surface and solar radiation covers approximately the wavelengths 350 nm to 4000 nm: Ultraviolet-A (UV-A), visible wavelengths, Near infrared (NIR) and Short-wavelength infrared (SWIR). Thermal infrared radiation, from materials with temperatures approximately in the interval −40° C. to 100° C., covers approximately the wavelengths 4000 nm to 40,000 nm=4 um to 40 um; The thermal infrared radiation interval being named or covered by: Mid-wavelength infrared (MWIR), Long-wavelength infrared (LWIR) or Far-infrared (FIR).

Prior art discloses different types of products for heating its content with energy derived from different wavelengths, for example different types of solar cookers are well known from prior art. The solar cookers according to the prior art have a bulky and solid housing and are thus heavy and not easily transported. These types of solar cookers are disclosed for example in patent application publications US 2015044345 A1 or US 2015208848 A1. In US 2015044345 A1 is disclosed a solar cooking apparatus comprising one or more solar ovens arranged in a fixed and parallel manner within a solar cooking apparatus frame, each oven having a first solar reflector, a second solar reflector, a solar collection element and a solar collection element holder, wherein the first solar reflector and the second solar reflector are concave and parabolic, and are in a substantially symmetrical arrangement to the solar collection element axis. In US 2015208848 A1 is disclosed a portable solar cooker comprising an upper functional assembly, a lower control assembly and a rotary apparatus which are sequentially connected, said upper functional assembly is configured to reflect sunlight, collect heat in a focusing manner and further heat water or foods, said upper functional assembly is closed to form a box body when being in a non-operative state, and said upper functional assembly is opened when being in an operative state, said lower control assembly is connected with said upper functional assembly, and makes said upper functional assembly subjected to pitch adjustment, said lower control assembly is connected with said rotary apparatus and said lower control assembly and said upper functional assembly are driven by said rotary apparatus to rotate so that tracking the sun is realized. In these prior art solar cookers, the heating or cooking area is inside of a rigid or solid housing that is made from a thick and heavy material.

A more flexible and compact design is disclosed in patent application publication MX 2007003296 A, in which is disclosed a bubble wrap and foil bag for cooking food using solar radiation, which is formed by an anodized foil bag being matte black at the outer portion thereof, said bag being located inside a transparent bubble wrap bag. In this solar cooker the solar radiation is passed through the transparent bubble wrap bag to the matte black surface of the anodized foil bag. In this the heating unit, i.e., the anodized foil bag is made with anodized aluminum, which has an absorption factor (aS) of between 0.8 to 0.88 and an emission factor (E) in the same range of 0.8 to 0.88 and thus ratio aS/E is between 0.9 and 1.1. Due to this low ratio the design disclosed in the publication MX 2007003296 A is not efficient in heating up and can reach only a maximum temperature of 90° C. at the inner portion of the foil bag.

In publication ES 1077068 U is disclosed a packaging container for food heatable by solar energy comprising in combination a container defining an inner chamber for containing said food to be heated, open at the top and covered by at least one first sheet or covered by a black material, said chamber having a folding lid comprising, on its inner face, a mirror or specular reflecting sheet.

In publication US 2011011808 is disclosed a flexible water-tight resealable container, wherein said container comprises a top and a bottom, wherein said bottom comprises at least one resealable opening, wherein said resealable opening comprises at least one water-tight spout with a mating resealable cap, wherein one or more reusable temperature indicators for indicating the temperature history of the water contained in said container are positioned within said resealable cap, and wherein said temperature indicator is a glass tube containing wax therein that melts at pasteurization temperatures; and there is/are one or more energy converting structures therein, as an integral part of said container, a first insulation structure on the top of said container, wherein said first insulation structure comprises a matrix containing a plurality of substantially air-tight structures having gas contained therein, and wherein said first insulation structure contains one or more vents in the matrix between said plurality of substantially air-tight structures for releasing moisture that would otherwise collect on the underside of said first insulation structure, and a second insulation structure on the bottom of said container, wherein said second insulation structure is selected from a matrix containing a plurality of substantially air-tight structures having gas contained therein, closed cell foam or open cell foam, wherein said insulation structures collectively are sufficient to enable said pasteurizer to achieve water temperatures of at least 60° C., wherein said insulation structures are an integral part of said container and in the construction the container has the energy converting structure inside the container.

An object of the invention is to create a product for heating the content with energy from different wavelengths, in which the disadvantages and problems of prior art are eliminated or at least minimized.

An object of the invention is to provide a new type of solar heater, in which disadvantages especially relating to the low maximum heating temperature and bulkiness are eliminated or at least minimized.

In order to achieve the above mentioned objects the product for heating according to the invention is mainly characterized by the features of the characterizing clause of claim 1. Advantageous embodiments and features are disclosed in the dependent claims.

The product for heating according to the invention comprises at least one selective absorber, which when exposed to wavelengths ranging from 350 nm to 40.000 nm, generates thermal energy that is used for heating a content located next to or inside the product. By the invention a flexible and lightweight product for heating is achieved.

The product for heating according to the invention comprises at least one heating unit that comprises a base material layer and a selective absorber layer on at least one of the sides of the base material layer and at least one insulation layer of transparent flexible material located on the heating unit. The layers of the heating unit and insulation layers on the heating unit are attached to each other air-tightly such that between at least some of the layers closed at least one air pocket is formed. The content to be heated by the product is located such that it is next to the base material of the heating unit of the product. The temperature of the content to be heated by the product will be 90° C.-160° C., as the result of the product being exposed to the radiation of the selected wavelengths.

The product according to the invention is a flexible and lightweight product for heating comprising a selective absorber. When the selective absorber is exposed to wavelengths ranging from 350 nm to 40.000 nm, it will generate thermal energy that will be used for heating the content. The input source for the wavelengths is advantageously for example solar radiation but also other radiation in wavelengths 350 nm-40 000 nm can be used. For heating the content the radiation is converted into thermal energy by the selective absorber layer of the product, which selective absorber layer is located advantageously on top of a base material, which is advantageously aluminum. The selective absorber layer is advantageously titanium oxide nitride or ceramic material. The selective absorber layer has an absorption factor (aS) of a minimum of 0.9 and an emission factor (E) of a maximum of 0.1. The ratio between the absorption factor (aS) and the emission factor (E) is equal or higher than 9 allowing the heating unit to heat up the content to 90° C.-160° C.

Advantageously the at least one insulation layer underneath the heating unit is at least partially attached to the sides of the heating unit such that a pocket or a pouch is formed and content to be heated is located inside the pocket or the pouch.

Advantageously the product for heating can also be formed as a sheet like product. The sheet-like product can thus be wrapped around the content to be heated.

Advantageously the product for heating can comprise a case or corresponding container for the content to be heated and the heating unit and the at least one insulation layer on the heating unit can be located as a deck of the case or the container.

According to an advantageous embodiment the product comprises two heating units connected to each other, which heating unit comprises a base material and a selective absorber layer on at least one of the sides of the base material, at least one insulation layer of a transparent flexible material covering each of the heating units. The heating units are attached to each other at least partially on the sides such that a pouch or a pocket is formed. In this embodiment the heating by the selected wavelengths radiation to the product can be provided from both sides of the product or the product can be turned at intervals to heat both sides of the content.

The insulation layer is advantageously plastic.

According to an advantageous feature of the invention the product comprises a mechanism for closing or sealing the product, which mechanism is advantageously re-closable or re-sealable.

According to an advantageous feature of the invention the product comprises an indicator for indicating the temperature of the content.

According to an advantageous feature of the invention the product comprises a transparent area forming a window so that the content can be seen without opening the product.

Advantageously the pouch or container is re-closable or re-sealable depending on the use.

The product can be formed in different shapes such as a bag or pouch shape, box shape or a wrap-around sheet. The product is advantageously utilized so that the end user can add the content to be heated into the product before heating. Or the product can also be used as a pre-packed product, such as a ready meal, which is heated in the product.

The materials advantageously used, especially for the heating unit and the at least one insulation layer are thin material, whereby these parts of the product are light and cost-effective. Advantageously the heating unit and the at least one insulation layer of the product is foldable and of flexible material thus permitting storage in a small space and also easy transportation.

The product can also according to one advantageous embodiment comprise below the heating unit and the at least one insulation layer located container that can contain the content to be heated, for example a pre-packed substance to be heated. The product comprising the container is advantageously surrounded by a releasable, protective cover. Advantageously inside the protective cover is attached a reflective surface, which after removing the protective cover is used to direct the radiation onto the heating unit thus enhancing the heating.

The product for heating can also according to one advantageous embodiment comprise a transport case for the product. During transport the transport case is protecting the product and its content to be heated from being exposed to wavelengths and keeping the content of the product cool. The transport case advantageously comprises a reflective surface located inside the transport case. When the transport case is opened, it will expose the product and the reflective surface to wavelengths to heat up the heating unit and thus the content of the product.

In the following the invention is explained in detail with reference to the accompanying drawing to which the invention is not to be narrowly limited.

In FIG. 1 is shown schematically an advantageous example of the product for heating according to the invention with one heating unit and several insulating layers.

Figure 2:
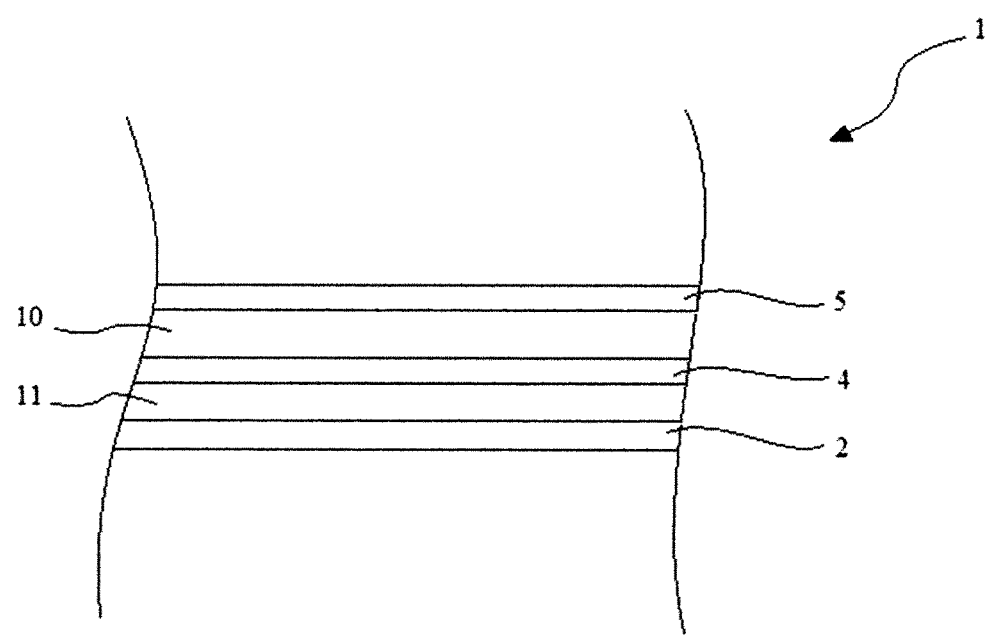

In FIG. 2 is shown schematically a cross section view of the product according to FIG. 1.

Figure 3:
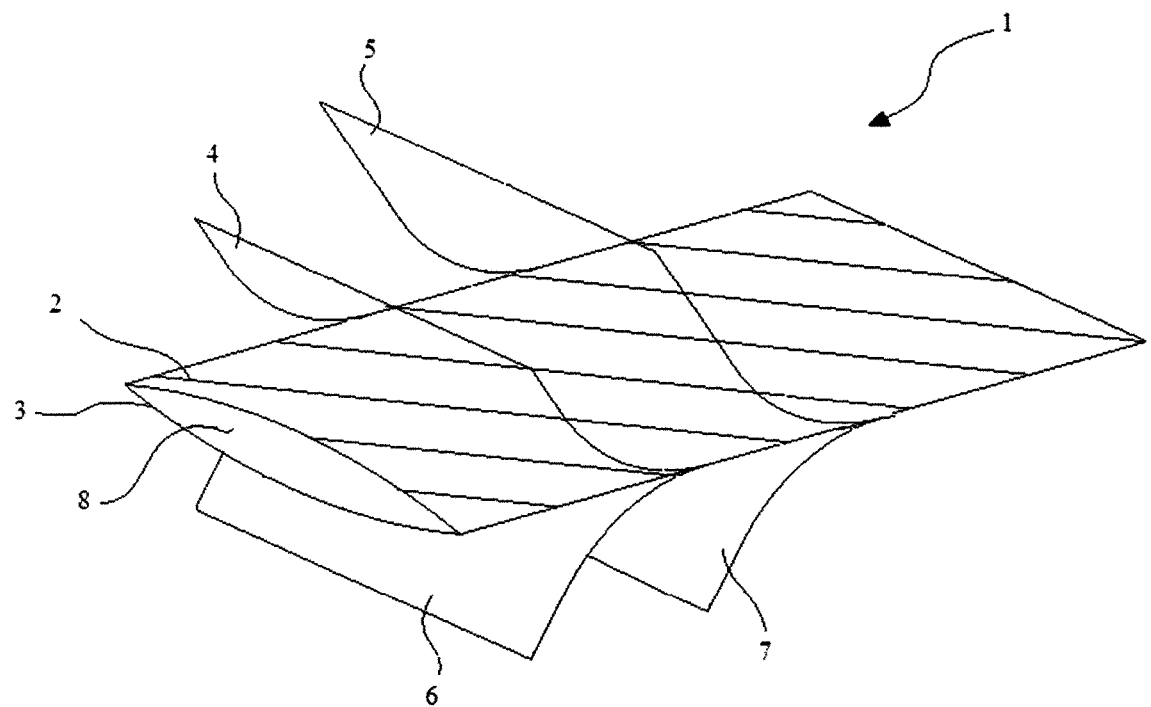

In FIG. 3 is shown schematically another advantageous example of the product for heating according to the invention with two heating units and several insulating layers.

Figure 4:
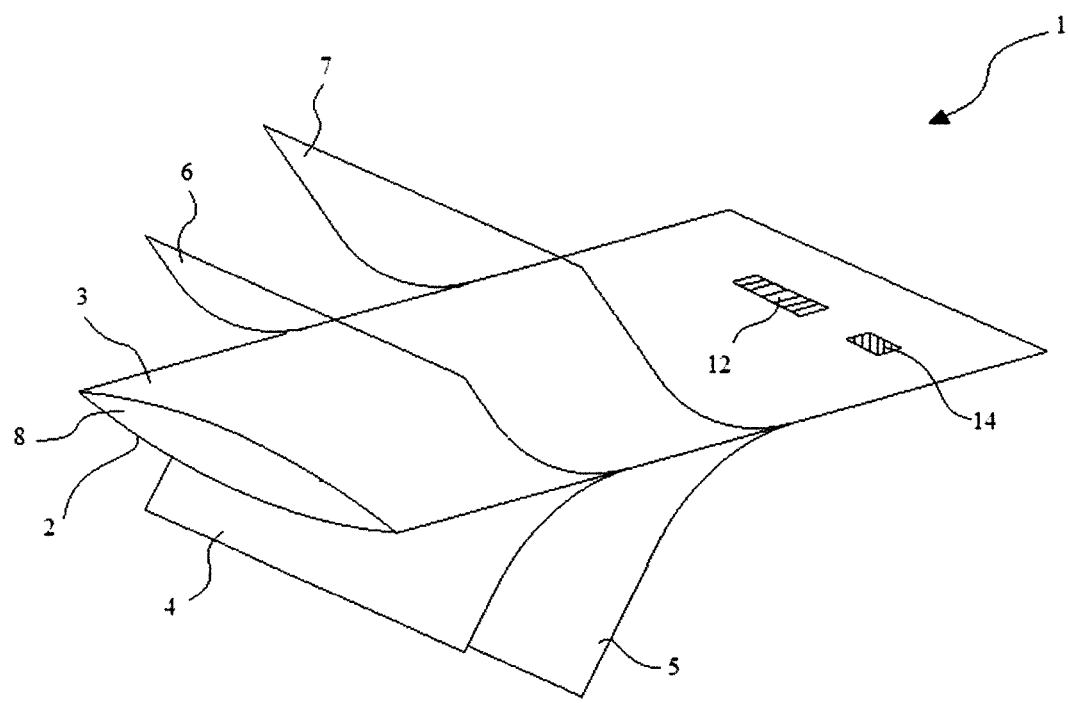

In FIG. 4 is shown schematically another advantageous example of the product for heating according to the example of FIG. 3 with further advantageous features.

Figure 5:
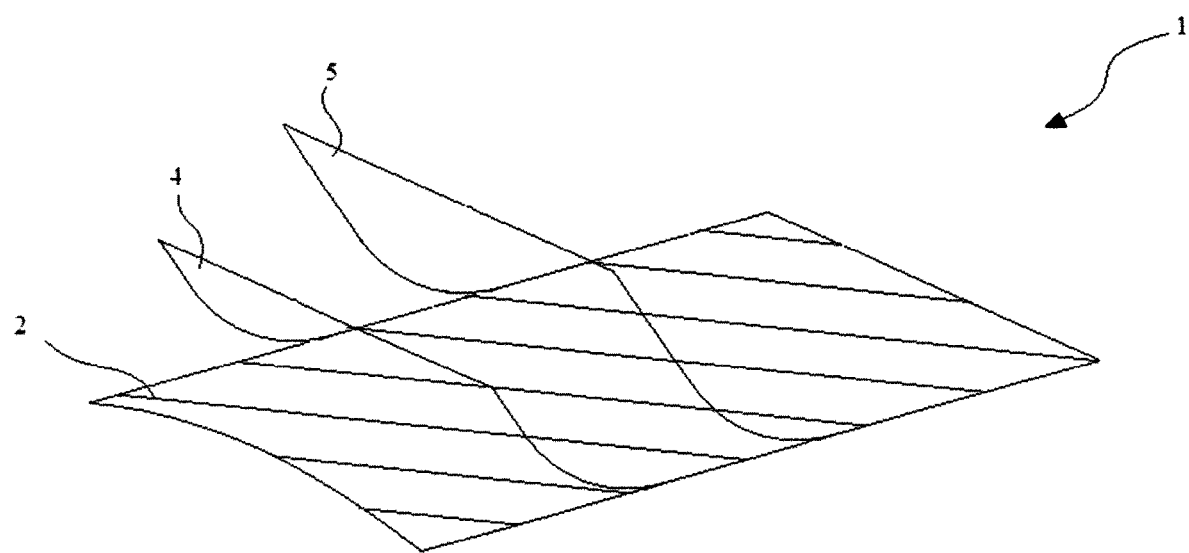

In FIG. 5 is shown schematically another advantageous example of the product for heating according to the invention forming sheet-like structure to be wrapped around the content to be heated.

Figure 6:
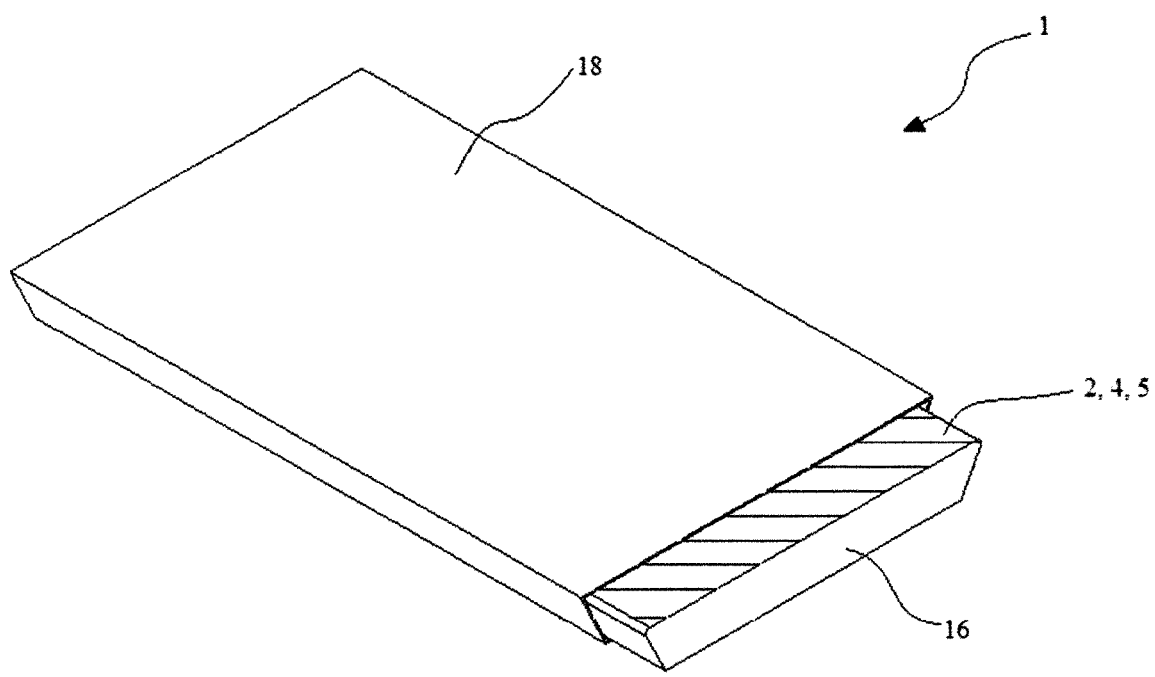
Figure 7:
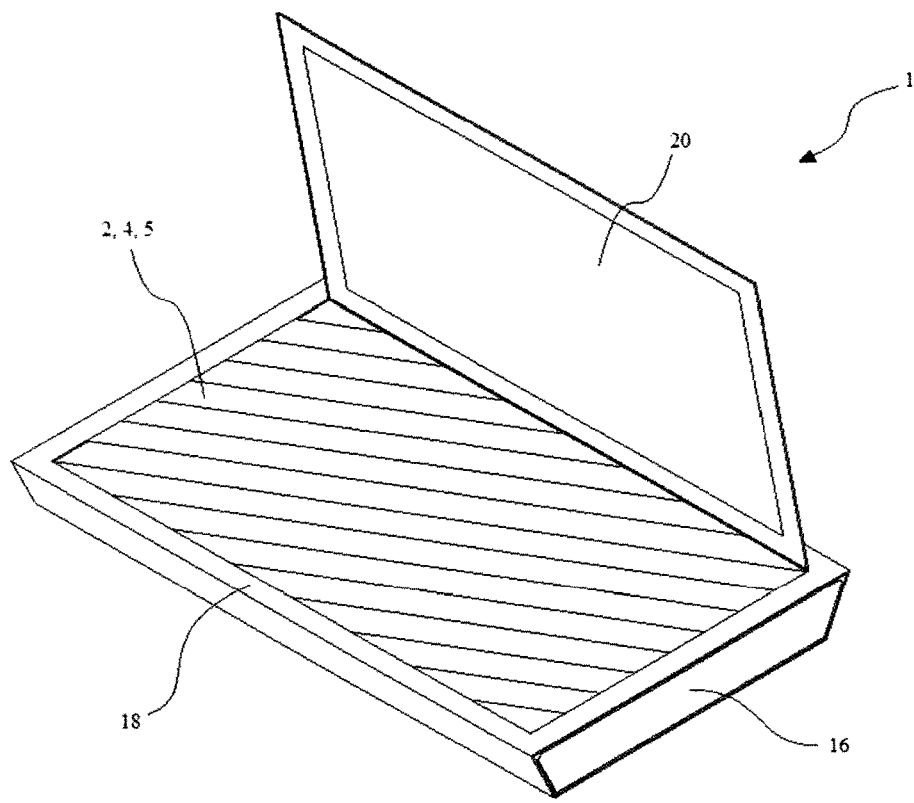

In FIGS. 6-7 is shown schematically another advantageous example of the product for heating according to the invention comprising a container and a protective cover.

Figure 8:
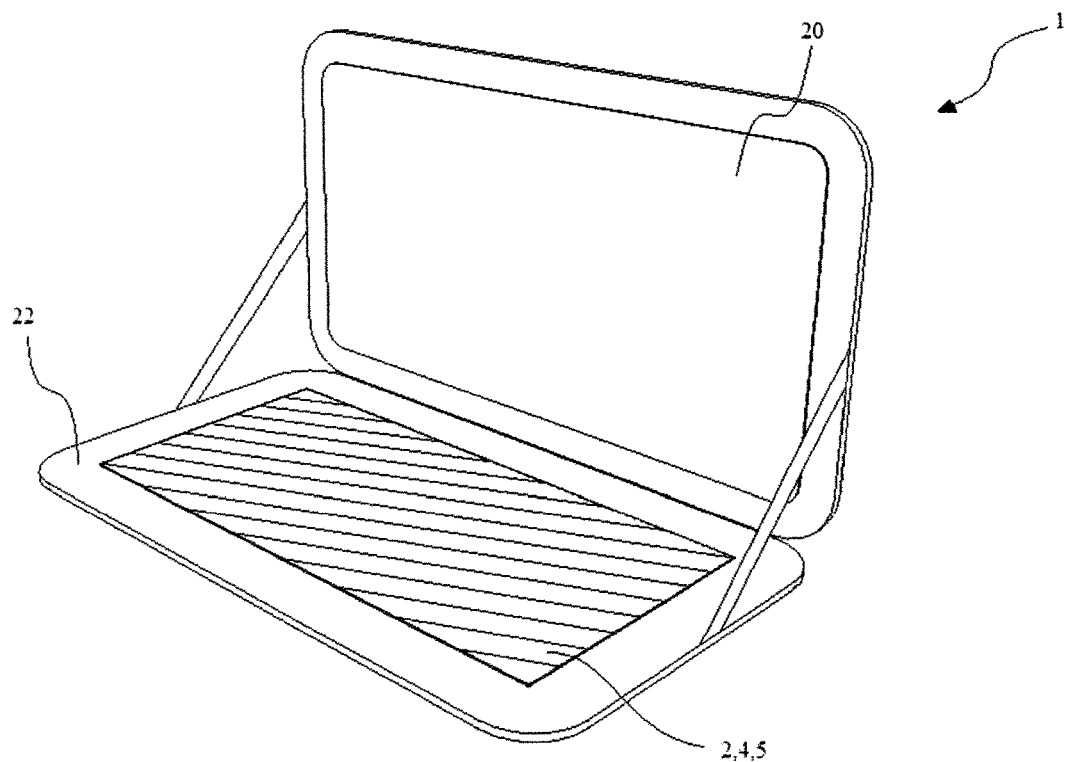

In FIG. 8 is shown schematically another advantageous example of the product for heating according to the invention with a transport case.

During the course of the following description and in the accompanying figures corresponding numbers and signs will be used to identify corresponding elements according to the different views which illustrate the invention and its advantageous examples. In some figures repetition of the reference signs may have been omitted for clarity reasons.

In the example of FIG. 1 the product 1 comprises one heating unit 2 and several insulating layers 4, 5, 6, 7. The heating unit 2 comprises a base material, which is advantageously aluminum, and a selective absorber layer, which is advantageously titanium oxide nitride or ceramic material. On the heating unit 2 there is located at least one transparent insulation layer 4, 5. In the example of FIG. 1 there are two transparent insulation layers 4, 5. The transparent insulation layers 4, 5 are attached onto the heating unit 2 on sides, or edges such that airtight insulation pockets are formed between layers to reduce the heat loss. In this example located underneath the heating unit 2 is one insulation layer 6 that is attached to the heating unit 2 at least partially, for example such that three sides are closed and one side is open, and an opening 8 is provided. Content to be heated by the product 1 is in this example to be placed inside the product 1 through opening 8 into the volume between the heating unit 2 and the insulation layer 6 next to it. Another insulation layer 7 is attached to the insulation layer 6 on the sides. The attachment between the insulation layers 6, 7 is airtight and an air pocket is provided. The insulation layers 6, 7 form insulation underneath the content to be heated by heating unit 2 to reduce the heat loss. The opening 8 can be provided with a mechanism for closing or sealing the opening 8. The mechanism can be re-closable or resealable.

In FIG. 2 is shown an example of a cross section of the product 1 according to FIG. 1. The cross section of the product 1 is formed of the heating unit 2, the insulation layers 4, 5 and in between the heating unit 2 and the insulation layers is located a thin air layer (air pocket) 10, 11. The thickness of the air layer 10, 11 is dependent on the desired insulation. Advantageously the thickness of the air layer 10, 11 is minimal. When more insulation is desired; the thickness of the air layer 10, 11 is increased. Correspondingly thin air layers (air pockets) are provided between other insulation layers 6, 7.

In the example of FIG. 3 the product 1 comprises two heating units 2, 3 and several insulating layers 4, 5, 6, 7. The heating units 2, 3 comprise a base material with the selective absorber layer. The heating units 2, 3 are attached to each other on sides at least partially, for example such that three sides are closed and one side is open, and an opening 8 is formed. The selective absorber layer of each heating unit 2 and 3 is facing outward and the base material layer inward. The content to be heated can be placed inside the product through opening 8. The opening 8 is advantageously provided with a mechanism that closes or seals the opening 8. The mechanism can be re-closable or re-sealable. In this example the insulating layers 4, 5 of the upper side of the product 1 are formed as in the example of FIG. 1 but underneath the other heating unit 3 at least one transparent insulation layer 6 is located, in the example of the FIG. 3 two transparent insulation layers 6, 7 are located. The transparent insulation layers 6, 7 are attached to the heating unit 3 such that one or more airtight insulation layers forming air pockets are formed to reduce the heat loss. The content to be heated by the product 1 is placed in the area between heating units 2, 3. In this example, where the heating units 2, 3 are located on both sides of the product 1, the product 1 is turnable over such that the heating effect can be provided from either side, by this the overall heating time is reduced.

In FIG. 4 is shown schematically another advantageous example of the product 1 for heating according to the example of FIG. 3 with further advantageous features. On the backside of the product 1 is located a transparent window 12, so the content to be heated inside the product 1 can be seen without opening the product 1. The product 1 may also comprise an indicator 14 which indicates the temperature of the content, for example in case the temperature of the content is over 90° C. the indicator has green color and in case the temperature of the content is less than 90° C. the indicator has red color.

The example shown in FIG. 5 comprises a heating unit 2 that comprises a base material with the selective absorber layer. On top of the heating unit 2 there is/are one or multiple transparent insulation layer/-s 4 and 5. The transparent layers 4 and 5 are connected to the heating unit 2 at least on the sides such that they will create one or multiple airtight insulation layers, air pockets, to reduce the heat loss. This example is suitable for example to be wrapped around the object to be heated.

The example shown in the FIGS. 6-7 comprises a heating unit 2 that comprises a base material with the selective absorber layer. On top of the heating unit 2 there are one or multiple transparent insulation layers 4 and 5. The transparent insulation layers 4 and 5 are connected to the heating unit 2 in such a way that they will create one or multiple airtight insulation layers, air pockets, to reduce the heat loss. Below the heating unit 2 and transparent layers is a case or a container 16 for the content to be heated. The content can be a pre-packed substance to be heated. There can also be a re-closable closing means for attaching the heating unit 2 and insulation layers 4, 5 onto the container 16. In this example the container 16 and the heating unit 2 is surrounded by a protective cover 18. Inside the protective cover 18 is advantageously a reflective surface 20. When the protective cover 18 is opened it will expose the container 16 with the heating unit 2 and the reflective surface 20 to wavelengths that are needed to heat up the heating unit 2 and the reflective surface enhances the heating effect.

The example shown in the FIG. 8 comprises a transport case 22 for heating unit 2 and the insulation layers 4, 5. During transport the transport case 22 is protecting the heating unit 2, insulation layers 4, 5 and the content to be heated from being exposed to wavelengths and keeping the content cool. Inside the transport case 22 is a reflective surface 20. When the transport case 22 is opened, it will expose the heating unit 2 and the reflective surface 20 to wavelengths that are needed to heat up the heating unit 2 and the content inside.

The examples and features of the examples described above and shown schematically in the figures can be combined in various ways.

Above only some advantageous examples of the invention has been described to which examples the invention is not to be narrowly limited and many modifications and alterations are possible within the invention as defined in the following claims.

The invention claimed is:

1. A package (1) with integrated solar heating function, which comprising at least one heating unit (2), in which the heating unit (2), comprises a base material layer with an emission reducing structure on top of an energy converting structure, combined together to form a selective absorber layer on at least one of the sides of the base material layer, at least one insulation layer (4, 5, 6, 7) of transparent flexible material located on the heating unit (2), which heating unit and the at least one insulation layer on the heating unit (2) of the package (1) are attached to each other air-tightly on the sides such that between at least the heating unit (2), and insulation layer (4, 5, 6, 7) at least one closed air pocket (10, 11) is formed, characterized in that the content to be heated by the package (1) is located below to the base material of the heating unit of the package (1), that temperature of the content of the package (1) will be 90° C.-160° C., as result of the placing the package (1) exposed to radiation of selected wavelengths, and that the energy converting structure in the selective absorber layer has an absorption factor (aS) of a minimum of 0.9 and the emission reducing structure has an emission factor (E) of a maximum of 0.1 and that ratio between the absorption factor (aS) and the emission factor (E) is equal or higher than 9 and that when the selective absorber is exposed to wavelengths ranging from 350 nm to 4000 nm, the energy converting structure converts the wavelengths to thermal radiation energy ranging from 4000 nm to 40.000 nm and the emission of thermal radiation energy is reduced by the emission reducing structure and the contained energy is being used for heating the content of the package (1).

2. Package according to claim 1, characterized in that the base material layer is advantageously aluminum and the energy converting structure with the emission reducing structure advantageously are titanium oxide nitride or ceramic material.

3. Package according to claim 1, characterized in that the insulation layer (4, 5, 6, 7) is plastic.

4. Package according to claim 1, characterized in that the package (1) further comprises at least one insulation layer (6, 7) underneath the heating unit (2) at least partially attached to the sides of the heating unit (2) such that an opening (8) is formed and a pocket or a pouch is formed and content to be heated is to be located inside the pocket or the pouch.

5. Package according to claim 1, characterized in that the package (1) for heating is formed as a sheet-like package and that the sheet-like package is to be wrapped around the content to be heated.

6. Package according to claim 1, characterized in that the package for heating comprises a case or a container (16) for the content to be heated and the heating unit (2) and the at least one insulation layer (4, 5) on the heating unit (2) is located as a deck of the case or the container (16).

7. Package according to claim 1, characterized in that the package (1) comprises two heating units (2, 3) connected to each other, which heating units comprise a base material and a selective absorber layer on at least one of the sides of the base material, and at least one insulation layer (4, 5, 6, 7) of a transparent flexible material covering each of the heating units (2, 3), and that the heating units (2, 3) are attached to each other at least partially on the sides such that a pouch or a pocket is formed.

8. Package according to claim 1, characterized in that solar radiation is used for the selective absorber layer to generate thermal energy for heating the content of the package (1).

9. Package according to claim 1, characterized in that the package (1) comprises a mechanism for closing or sealing the opening (8) of package (1), which mechanism is advantageously re-closable or re-sealable.

10. Package according to claim 1, characterized in that the package (1) comprises an indicator (14) for indicating the temperature of the content.

11. Package according to claim 1, characterized in that the package (1) comprises a transparent area (12) forming a window so that the content can be seen without opening the pouch, pocket or container.

12. Package according to claim 1, characterized in that the package (1) further comprises a container (16) surrounded by a releasable, protective cover (18) and that advantageously inside the protective cover (18) is attached a reflective surface (20).

13. Package according to claim 1, characterized in that the package (1) comprises a transport case (22) for the package and that the transport case (22) advantageously comprises a reflective surface located inside the transport case.

14. Package according to claim 1, characterized in that the package (1) is formed as a pocket or pouch shape, box shape or a wrap-around sheet package.

* * * * *

UNITED STATES PATENT AND TRADEMARK OFFICE
CERTIFICATE OF CORRECTION

PATENT NO. : 10,801,754 B2
APPLICATION NO. : 16/067389
DATED : October 13, 2020
INVENTOR(S) : Nina Borger and Alle Borger It is certified that error appears in the above-identified patent and that said Letters Patent is hereby corrected as shown below:

On the Title Page

Please add the line at item (73) Assignee:
"SOLFOIL OY, Vantaa (FI)"

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*